March 14, 1950  E. H. SHAFF  2,500,326
TWO SPEED HOIST
Filed March 10, 1947  2 Sheets-Sheet 1
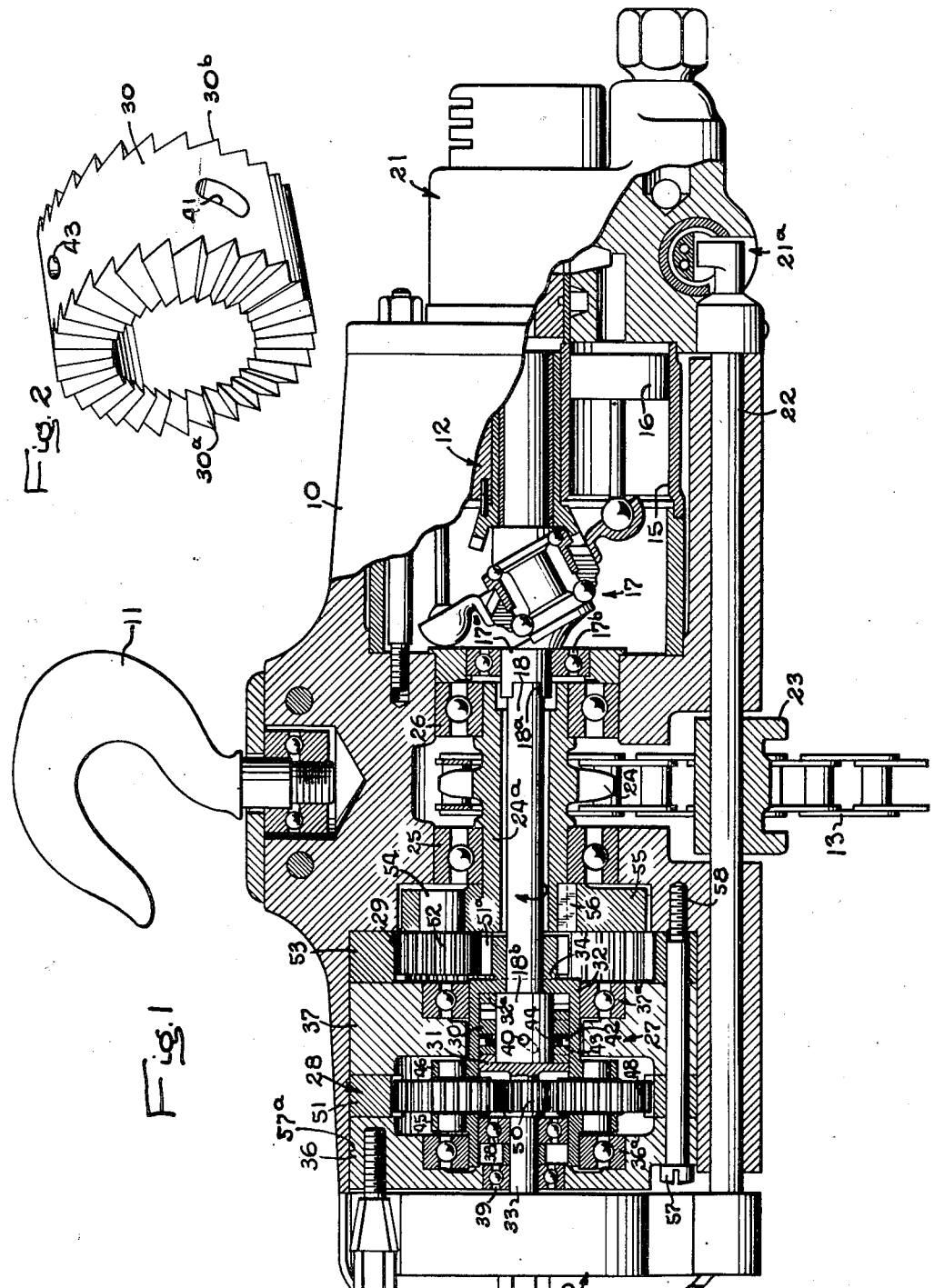
INVENTOR
Ernest H. Shaff

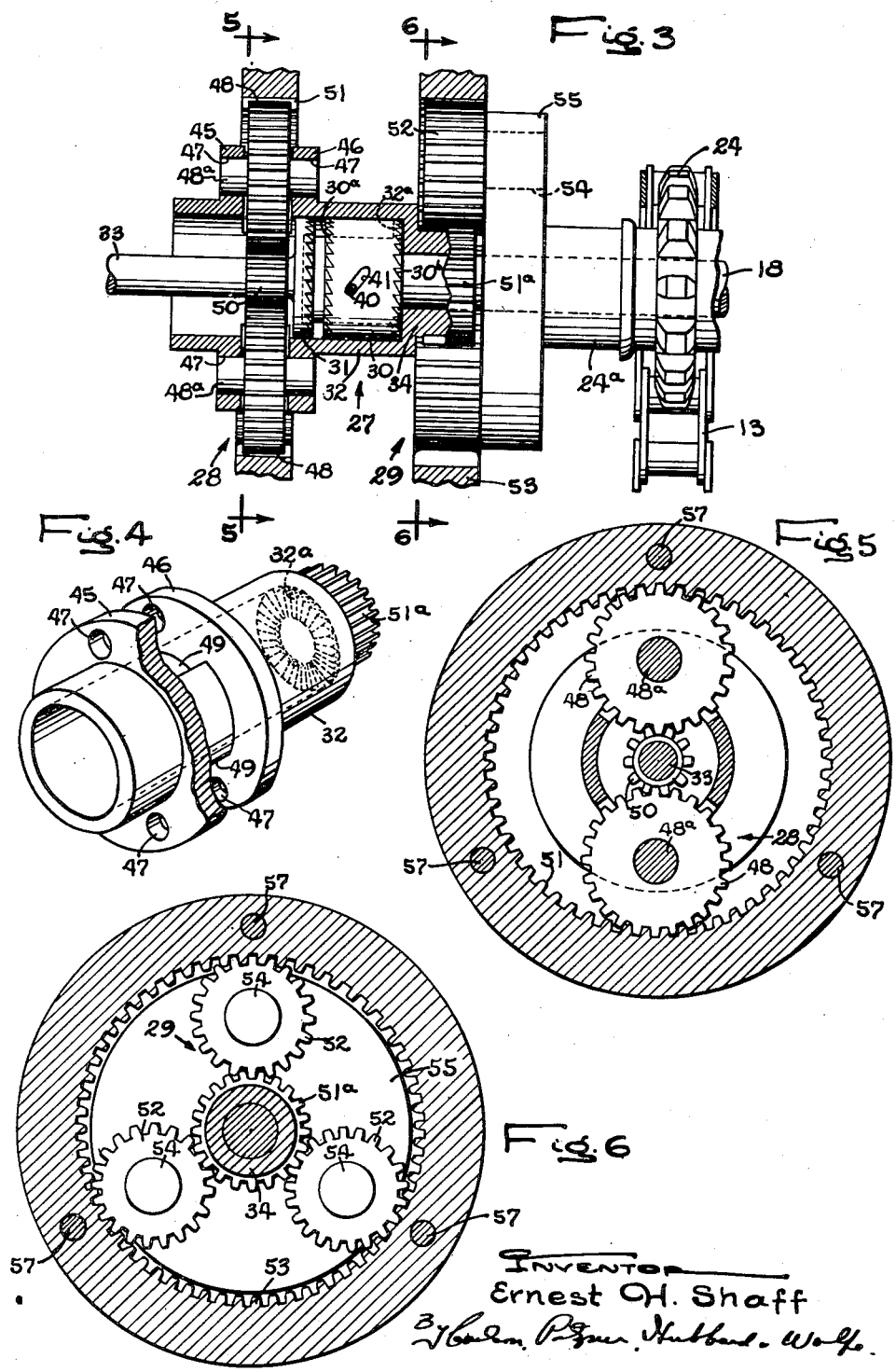

Patented Mar. 14, 1950

2,500,326

UNITED STATES PATENT OFFICE 2,500,326

TWO-SPEED HOIST

Ernest H. Shaff, Spring Lake, Mich., assignor to Keller Tool Company, Grand Haven, Mich., a corporation of Michigan Application March 10, 1947, Serial No. 733,664

17 Claims. (Cl. 254—168)

The present invention pertains to portable hoists and has especial reference to a new and improved speed changing mechanism therefor.

The object of the invention generally stated is to provide a speed changing mechanism for a portable hoist, which is simple in construction, effectual in operation and susceptible of economical manufacture.

A further object is to provide a speed change mechanism for a hoist including two planetary gear trains and a clutch member so arranged that both gear trains are employed for speed reduction in the raising operation and only one is employed for lowering.

Another object lies in the provision of speed changing means for a hoist, which is operable upon reversal of the direction of operation of the hoist motor to permit of increased lowering speed when there is no load on the hoist, but which is rendered inoperative under a load.

Still another object is to provide in a speed change means for a hoist, a construction permitting assembly of the various elements as a unit for insertion into the hoist housing.

Other objects and advantages of the invention will become apparent from the following detailed description taken in conjunction with the accompanying drawings, in which:

Figure 1 is a sectional side elevation of a hoist in which the present invention is incorporated.

Fig. 2 is a perspective view of the speed change clutch driving element.

Fig. 3 is a fragmentary side elevational view, on an enlarged scale, of the speed changing means.

Fig. 4 is a perspective view of the gear cage of the speed changer.

Fig. 5 is a transverse section taken substantially in the plane of line 5—5 of Fig. 3.

Fig. 6 is a transverse section taken substantially in the plane of line 6—6 of Fig. 3.

While the invention is susceptible of various modifications and alternative constructions, there is shown in the drawings and will herein be described in detail the preferred embodiment, but it is to be understood that it is not thereby intended to limit the invention to the specific form disclosed, but it is intended to cover all modifications and alternative constructions falling within the spirit and scope of the invention as expressed in the appended claims.

In the embodiment of the invention herein shown for purposes of illustration the hoist comprises an elongated, generally cylindrical housing 10 equipped with a central suspension hook 11 and enclosing a pressure fluid operated motor 12 for actuating a load supporting sprocket chain 13. The motor 12 is of the type comprising a circumferentially arranged series of cylinders 15 having pistons 16 acting through a wobble plate transmission 17 to impart rotary motion to a shaft 18 journaled at opposite ends of the housing axially thereof. Enclosed within an end cap 19 at the left-hand end of the housing, as viewed in Fig. 1, is a brake mechanism 20 which is adapted to apply a braking force to the motor shaft 18 when the motor is idle. The motor 12 is reversible and pressure fluid is supplied thereto under the control of a distributing valve mechanism 21.

A manually operable control shaft 22 extends lengthwise of the housing along the lower side thereof and carries a central operating lever 23 whereby the shaft may be rocked by the operator. One end of the shaft, herein the left end, is operatively associated with the brake mechanism, and the other end is operatively associated with a combined throttle and reversing valve mechanism 21a governing the direction of rotation of the motor and the rate of admission of pressure fluid thereto in order to control its speed.

Rotary motion imparted to the shaft 18 is transmitted to a hoisting member, herein shown in the form of a chain sprocket 24 on which is carried the link chain 13, through the medium of an improved speed reduction and torque multiplication means interposed between the shaft and the sprocket. In the present instance, the sprocket 24 is integrally formed with a sleeve 24a and is loosely telescoped over the shaft 18 and each is journaled for independent rotation. As shown, the sleeve 24a extends longitudinally of the hoist housing and is supported adjacent its ends in bearings 25 and 26. The shaft 18 extends through the sleeve 24a and terminates at its right end in a tongue 18a which is held in a complementary groove formed in the output shaft 17a of the wobble plate transmission 17, the shaft 17a being supported by a bearing 17b. The left end of the shaft 18 is operatively associated with and supported by a clutch 27 in a manner which will presently be described.

In accordance with my invention, the sprocket shaft 24a is arranged to be driven in one direction, namely, the lifting direction, by two planetary gear trains 28 and 29, connected in series by the clutch 27, and in the lowering direction by the clutch 27 and gear train 29 only. For this purpose the clutch comprises a driving element in the form of a sleeve 30 mounted on the shaft 18 for axial movement and shiftable automatically when the shaft is driven in a raising direction, into driving engagement with a driven element or disk 31 operatively associated with the planetary gear train 28. When the parts are thus engaged the gear train 28 operates to drive at reduced speed a motion transmitting member herein in the form of a hollow cylinder 32, which in turn is operatively connected with the planetary gear train 29 to impart a further speed reduction to the shaft 24a. Conversely, when the direction of rotation of the shaft 18 is reversed, the clutch element is disengaged from the disk 31 and into direct driving engagement with the cylinder 32 so that the planetary gear train 28 is effectually by-passed and the shaft 24a driven solely through the gear train 29.

As herein shown, the motion transmitting cylinder 32 constitutes a housing for the clutch 27 and it additionally serves as a support for various parts of the planetary gear train 28 including an axially alined stub shaft 33 rigid with the disk 31. As shown, the cylinder is supported in bearings 36a and 37a carried respectively by frame disks 36 and 37. It is mounted coaxially of the shaft 18 and has a reduced hub portion 34 receiving and supporting said shaft.

The driving element 30 of the clutch 27 is in the form of a sleeve telescoped over and shiftable axially upon an enlarged portion 18b of the shaft 18. It has an annular series of inclined clutch teeth 30a on one end and a similar series of oppositely inclined teeth 30b at its other end (Figs. 2 and 3). The teeth 30a are adapted to mesh with complementary teeth on the driven clutch element 31 which is in the form of a disk on a shaft 33 supported in axial alinement with the shaft 18. The teeth 30b on the other hand are adapted to engage with the clutch teeth 32a rigid with the inner end of the cylinder 32. As shown, the stub shaft 33 is supported in the cylinder 32 through the medium of a bearing 38, and in the frame disk 36 through the medium of a bearing 39.

Appropriate means is provided to shift the clutch sleeve 30 axially with respect to shaft 18. In the preferred form this means comprises a pin-and-slot type actuator which comprises a pin 40 fixed in the shaft 18 and projecting radially therefrom and an inclined cam slot 41 formed in the side of the clutch sleeve 30 intermediate its ends. So that the clutch sleeve 30 will be shifted axially through the action of this pin-and-slot actuator when the direction of rotation of the shaft is reversed, means is provided to resist the tendency of the sleeve 30 to follow the rotation of the shaft. Preferably, this means is in the form of friction plugs 42 which are positioned in radially extending holes 43 in the body of the sleeve 30 and which are urged radially outwardly by the action of springs 44 to frictionally engage the inner walls of the hollow cylinder 32.

The cylinder 32 also serves as a gear cage for the gear train 28 and as a terminal element therefor. To this end a pair of radially extending and axially spaced flanges 45 and 46 (Figs. 3 and 4) are formed rigid with the cylinder. Diametrically positioned in each of the flanges are a pair of apertures 47 each of which is alined with a corresponding one in the other flange. Through these apertures are passed stub shafts 48a for intermediate planetary gear elements 48 of the gear train 28. In the wall of the cylinder between the flanges 45 and 46 and centered with respect to the flange apertures 47 are slots 49 through which planetary gears 48 project into meshing relation with a sun gear 50 rigid with the stub shaft 33. As seen in Fig. 5, the planetary gears 48 revolve within a stationary ring gear 51 which is positioned between the frame disks 36 and 37.

The cylinder 32 constitutes the input element for the second gear train 29 and for this purpose the hub 34 of the cylinder is formed with teeth to provide a sun gear 51a meshing with planetary gears 52 which run within a stationary ring gear 53. The planetary gears 52 are supported on stub shafts 54 which in turn are journaled in a disk 55 secured to the sprocket shaft 24a by means of a key 56.

Referring particularly to Fig. 1, it will be seen that the major portion of the clutch and gear mechanism is adapted to be initially assembled as a unit for insertion into a chamber 57a at one end of the hoist housing 10. The components of this unit include the frame disks 36 and 37, stationary ring gears 51 and 53, the shaft 18, the hollow cylinder 32 enclosing the clutch 27 and supporting the sun and planetary gears 48 with the latter in mesh with the ring gear 51, and the sun gear 51a of the gear train 29. The parts are held in position on a plurality of bolts 57 and the assembled unit is then inserted into the hoist housing 10 with the frame disks 36, 37 and ring gears 51 and 53 slid into the chamber 57a. The planetary gears 52 having been preassembled on their stub shafts 54 in the disk 55, the ring gear 53 is moved into mesh with the gears 52 and with the sun gear 51a. At the same time, the shaft 18 is engaged with the motor driven shaft 17a. The unit is then secured in position by tightening the bolts 57 in threaded recesses 58 provided therefor in the housing 10.

In the lifting operation, the shaft 18 is rotated in a direction as indicated by the arrow in Fig. 1, with the driving clutch sleeve 30 shifted into driving engagement with the driven disk 31 to impart rotation to the sun gear 50 of the gear train 28. As a result, the hollow cylinder 32 is driven at a reduced speed. Member 32 in turn drives the driven shaft 24a through the medium of the planetary gear train 29, thus effecting a second gear reduction so that ample power is applied to the shaft for load lifting purposes.

For lowering purposes, the direction of rotation of the motor is reversed by rocking the control shaft 22. With no load on the sprocket chain, the friction plugs 42 resist the tendency of the clutch block 30 to follow the shaft 18 and thus the pin-and-slot actuator operates to shift the driving clutch sleeve 30 toward the right, disengaging it from the driven element 31 and engaging it directly with the hollow cylinder 32 (Fig. 3). The drive to the shaft 24a is now through the gear train 29 only. For this condition, therefore, with no load on the hoist, only a single speed reducing gear train is utilized and the resulting speed of operation is greater than for lifting condition.

When a load is suspended from the hoist chain, the downward pull exerted on the chain will be transmitted back through the gear train 29, the member 32, and the gear train 28 to the disk 31 thereby causing the disk 31 to tend to overrun the shaft 18. Thus there is set up a frictional holding pressure between the teeth on the disk 31 and those on the left end of the clutch block 30 in mesh therewith, which pressure is sufficient to overcome the effect of the friction plugs 42. As a result, the clutch element 30 will follow the shaft 18 (the pin-and-slot actuator being rendered ineffective), thereby causing both speed reducing gear trains to be utilized.

On the outer end of the stub shaft 33 is fixed the drum of the brake mechanism 20. This brake mechanism may be of the character disclosed in my copending application Serial No. 647,956, filed February 15, 1946. It operates to hold the load when the power is off and to control the descent of the load. With the hoist in lowering condition and the driving force applied directly to rotate the member 32, not only will the previously described action result, that is the drive through a single speed reducing gear train, but also the gear train 28 will be driven by the member 32. This will cause the shaft 33 to be rotated so as to render the brake mechanism effective. Thus it can be seen that the effectiveness of the brake assembly is present regardless of the condition of operation of the hoist.

It will be observed that the construction and arrangement set forth provides an extremely compact unit, simple in construction, easily assembled and disassembled, and effectual in operation. The entire driving mechanism for the hoist is arranged to operate about a common axis. Thus the entire hoist assembly including the power actuated driving means 12, the shaft 18, the speed change transmission including the clutch 27, gear trains 28 and 29 and the driven shaft 24a and hoist member 24 can be included within a single housing, thereby forming a compact assembly.

I claim as my invention:

1. A hoist having, in combination, a power drive shaft, a motor for driving said shaft in opposite directions selectively, load lifting and lowering means including a driven shaft mounted coaxially with respect to the drive shaft, and a speed change mechanism connecting said shafts and comprising a motion transmitting member mounted for rotation relative to said shafts coaxially thereof, a first planetary gearing of which said member constitutes one terminal element and having a sun gear constituting the other terminal element, a second planetary gearing having a sun gear rigid with said member and a terminal element connected with said driven shaft, and a clutch for connecting said drive shaft with the sun gear of the first planetary gearing or with said member selectively.

2. A hoist having, in combination, a drive shaft, a reversible motor for actuating said shaft, load raising and lowering means including a sprocket shaft disposed axially of said drive shaft, first and second planetary gearings each having a sun gear, a motion transmitting member rigid with the sun gear of the second planetary transmission and constituting the driven terminal element of the first planetary transmission, and a clutch comprising driven elements respectively connected to the sun gears and a driving clutch element operatively associated with the drive shaft and shiftable automatically into engagement with one or the other of said driven clutch elements according to the direction of rotation of the drive shaft, said second planetary transmission having a terminal element connected with said sprocket shaft.

3. A hoist having, in combination, a drive shaft, a reversible motor for driving said shaft in opposite directions, load raising and lowering means including a driven shaft mounted in axial alinement with said drive shaft, a cylinder in coaxial alinement with said shafts and mounted for rotation relative thereto, a planetary transmission having a driving terminal element rotatable relative to said cylinder, said cylinder constituting the other terminal element of said transmission, a second planetary transmission having one terminal element rigid with said cylinder and its other terminal element rigid with said driven shaft, and a clutch shiftable selectively into driving engagement with said driving terminal element of the first planetary transmission or into driving engagement with said cylinder.

4. A hoist having, in combination, a drive shaft, a reversible motor for driving said shaft in opposite directions, load raising and lowering means including a driven shaft mounted in axial alinement with said drive shaft, a hollow cylinder in coaxial alinement with said shafts and mounted for rotation relative thereto, a planetary transmission having a driving terminal element axially alined with said cylinder, said cylinder constituting the other terminal element of said transmission, a second planetary transmission having one terminal element rigid with said cylinder and its other terminal element connected with said driven shaft, and a clutch enclosed within said cylinder and having a driven element rigid with said cylinder, a clutch sleeve having a driving connection with said drive shaft and a second driven element connected with the driving terminal of the first mentioned transmission, said clutch sleeve being shiftable in one direction or the other according to the direction of rotation of the drive shaft into driving engagement with one or the other of the driven clutch elements.

5. A hoist having, in combination, a power drive shaft, a motor for driving said shaft in opposite directions selectively, load lifting and lowering means including a driven shaft mounted coaxially with respect to the drive shaft, and a speed change mechanism connecting said shafts and comprising a hollow member mounted for rotation relative to said shafts, a first planetary gearing of which said hollow member constitutes one terminal element and having a sun gear constituting the other terminal element, a second planetary gearing having a sun gear rigid with said hollow member and a terminal element connected with said driven shaft, and a clutch for connecting said drive shaft with the sun gear of the first planetary gearing or with said hollow member selectively, said hollow member constituting a housing enclosing said clutch.

6. A hoist having, in combination, a drive shaft, a reversible motor for driving said shaft in opposite directions, load raising and lowering means including a driven shaft mounted in axial alinement with said drive shaft, a hollow cylinder in coaxial alinement with said shafts and mounted for rotation relative thereto, a planetary transmission having a driving sun gear axially alined with said cylinder, said cylinder constituting the other terminal element of said transmission, a second planetary transmission having a sun gear rigid with said cylinder and its other terminal element rigid with said driven shaft, and a clutch enclosed within said cylinder and comprising a drive element operatively connected with said drive shaft for rotation therewith but shiftable in one direction or the other according to the direction of rotation of said shaft, a driven element rigid with the driving sun gear of the first planetary transmission and a second driven element rigid with said cylinder, said driving and driven clutch elements having clutch teeth engageable upon the shifting of the driving clutch element in one direction or the other and operative to drive said sun gears selectively.

7. A hoist having, in combination, a drive shaft, a reversible motor for driving said shaft in opposite directions, load raising and lowering means including a driven shaft mounted in axial alinement with said drive shaft, a cylinder in coaxial alinement with said shaft and mounted for rotation relative thereto, a planetary transmission having a driving terminal element axially alined with said cylinder, said cylinder constituting the other terminal element of said transmission, a second planetary transmission having one terminal element rigid with said cylinder and its other terminal element rigid with said driven shaft, a clutch having a driven element rigid with said cylinder, a clutch sleeve rotatable relative to said cylinder and having a driving connection with said drive shaft and a second driven element connected with the driving element of the first mentioned transmission, said clutch sleeve being shiftable in one direction or the other according to the direction of rotation of the drive shaft into driving engagement with one or the other of the driven clutch elements, and means frictionally retarding rotation of said clutch sleeve relative to said cylinder.

8. A hoist having, in combination, a drive shaft, a reversible motor for driving said shaft in opposite directions selectively, load raising and lowering means including a driven shaft, a rotary member having a gearing connection with said driven shaft, a planetary transmission for driving said member including a drive gear, a clutch selectively connecting said drive shaft with said drive gear or to said member directly and independently of said planetary gearing, said clutch including a driving element rotatable relative to said rotary member and having a connection with said drive shaft including a cam operative in the rotation of the shaft in a load lowering direction to shift the clutch driving elements into driving relation to said rotary member, and means tending to resist rotation of said driving element relative to said rotary member.

9. A hoist having, in combination, a drive shaft, a reversible motor for driving said shaft in opposite directions, load raising and lowering means including a driven shaft, and speed change mechanism connecting said shafts and comprising two speed reducing planetary transmissions each having driving and driven terminals, a member connecting the driven terminal of one transmission to the driving terminal of the other transmission, and means including a clutch operative selectively according to the direction of rotation of the drive shaft to drive the driven shaft through the medium of said two transmissions connected in series or through the medium of one only of said transmissions.

10. A hoist having, in combination, a drive shaft, a reversible motor for driving said shaft in opposite directions, load raising and lowering means including a driven shaft, and a speed change mechanism comprising a clutch having a shiftable element operatively connected with the drive shaft and movable in one direction or the other according to the direction of rotation of said shaft, a first speed reducing transmission operative when the clutch is shifted in one direction to effect a driving connection between the driving and driven shafts, said gearing including a drive element, and means including a planetary transmission operative when the clutch is shifted in the opposite direction to effect a driving connection between said two shafts including both of the transmissions, said planetary transmission having a driving terminal rigidly connected with said drive element of the first speed reducing transmission.

11. A hoist having, in combination, a drive shaft, a reversible motor for driving said shaft in opposite directions, load raising and lowering means including a driven shaft, and a speed change mechanism connecting said shafts and comprising a member mounted for rotation relative to the shafts, a planetary transmission having a terminal drive element, said member constituting the other terminal of said transmission and operatively connected with the driven shaft, and a clutch for connecting said drive shaft with said terminal drive element, said transmission including a stationary ring gear and a plurality of intermediate gears mounted on said member and meshing with said ring gear.

12. A hoist having, in combination, a drive shaft, a reversible motor for driving said shaft in opposite directions, load raising and lowering means including a driven shaft, and a speed change mechanism connecting said shafts comprising a planetary gearing having a driving sun gear, a rotary member having a speed reducing connection with the driven shaft, said member constituting a driven terminal element of said planetary gearing, and a clutch comprising a shiftable drive element operatively associated with the drive shaft and shiftable in one direction or the other axially thereof according to the direction of rotation of the drive shaft, a driven clutch element connected with said sun gear and engageable by the drive clutch element when the latter is shifted in one direction, a second driven clutch element connected with the rotary member and engageable by the drive clutch element when shifted in the opposite direction.

13. A hoist having, in combination, a drive shaft, a reversible motor for driving said shaft in opposite directions, load raising and lowering means including a driven shaft, and a speed change mechanism connecting said shafts comprising a planetary gearing having a driving sun gear, a rotary member having a speed reducing connection with the driven shaft, said member constituting a driven terminal element of said planetary gearing, and a clutch comprising a shiftable drive element operatively associated with the drive shaft and shiftable in one direction or the other axially thereof according to the direction of rotation of the drive shaft, a driven clutch element connected with said sun gear and engageable by the drive clutch element when the latter is shifted in one direction, a second driven clutch element connected with the rotary member and engageable by the drive clutch element when shifted in the opposite direction, said rotary member being in the form of a hollow cylinder disposed axially of the driving and driven shafts and constituting a housing enclosing said clutch.

14. A hoist having, in combination, a housing having a recess in one end, load lifting and lowering means including a driven sleeve journaled in said housing, a motor at one end of the housing having a power output shaft disposed axially of said sleeve at one end thereof, and a speed change mechanism having a drive shaft with a disengageable connection with said power output shaft of the motor, said speed change mechanism operatively connecting said two shafts and comprising a planetary gearing and a hollow member constituting one terminal element of the gearing, a sun gear having a supporting shaft journaled in said hollow member and constituting the other terminal element of said gearing, and a clutch enclosed by said member and operative to connect said drive shaft with said sun gear, the component parts of said speed change mechanism including said drive shaft adapted to be assembled as a unit for insertion into said recess of the housing.

15. A hoist having, in combination, a power drive shaft, a motor for driving said shaft in opposite direction selectively, load lifting and lowering means including a driven shaft, a member mounted for rotation relative to said shafts and having a gearing connection with the driven shaft, a planetary transmission having a sun drive gear, said member constituting a terminal element for said transmission, a shaft supporting said sun gear, clutch means including a shiftable element operative in one position to connect the drive shaft with the sun gear and in the other position to connect the drive shaft with said member, and a brake operatively associated with the sun-gear-supporting shaft.

16. A hoist having, in combination, a power drive shaft arranged to be driven in opposite directions, load lifting and lowering means including a driven shaft mounted coaxially with respect to the drive shaft, and a speed change mechanism connecting said shafts and comprising a hollow cylinder mounted for rotation relative to said shafts and a planetary gearing having a sun gear within said hollow cylinder, a stationary ring gear encircling the cylinder, and intermediate gears meshing with said sun gear and with said ring gear, said intermediate gears being rotatably mounted on the cylinder on axes disposed externally thereof, and said cylinder being apertured to receive said intermediate gears.

17. A hoist having a power drive shaft, load lifting mechanism comprising a driven shaft, a hollow cylinder rotatable relative to said drive shaft and having a speed reducing gearing connection with said driven shaft, a planetary gearing having a sun gear mounted within and axially of said cylinder, a stationary ring gear encircling the cylinder, intermediate gears mounted on said cylinder and meshing with said sun gear and said ring gear, said cylinder being slotted to receive said intermediate gears, and a clutch enclosed within said cylinder comprising a drive sleeve with clutch teeth at opposite ends, said sleeve having a driving connection with said drive shaft and shiftable axially of the latter, a driven clutch element rigid with said sun gear and having clutch teeth engageable by said driving clutch element when the latter is shifted in one direction, and a second driven clutch element rigid with said cylinder and having clutch teeth engageable by the driving clutch element when shifted in the opposite direction.

ERNEST H. SHAFF.

REFERENCES CITED

The following references are of record in the file of this patent:

UNITED STATES PATENTS

| Number | Name | Date |
| --- | --- | --- |
| 385,856 | Hambay | July 10, 1888 |
| 771,761 | Barrow | Oct. 4, 1904 |
| 1,311,236 | Kittredge | July 29, 1919 |
| 1,541,267 | Kittredge | June 9, 1925 |
| 2,367,041 | Moore et al. | Jan. 9, 1945 |